Sept. 21, 1965 L. W. BREHM ETAL 3,208,058

ALTERNATING ADVANCE AND BACKSPACE TAPE DRIVE

Filed Dec. 29, 1961 6 Sheets-Sheet 1

INVENTORS.
LYLE W. BREHM
WILLIAM F. MORGAN

BY Geoffrey Knight
ATTORNEY

Sept. 21, 1965 L. W. BREHM ETAL 3,208,058

ALTERNATING ADVANCE AND BACKSPACE TAPE DRIVE

Filed Dec. 29, 1961 6 Sheets-Sheet 6

3,208,058
ALTERNATING ADVANCE AND BACKSPACE TAPE DRIVE

Lyle W. Brehm, Endicott, N.Y., and William F. Morgan, Stamford, Conn., assignors to International Business Machines Corporation, New York, N.Y., a corporation of New York Filed Dec. 29, 1961, Ser. No. 163,324
8 Claims. (Cl. 340—174.1)

This invention relates to a tape drive and, more particularly, to a reversible tape drive for controlling the movement of a data recording tape in association with date recording and data sensing means.

In the operation of a widespread data processing network, such as may be used in an airline reservation system, a single central data processing unit (e.g., electronic computer) must receive data from and send data to many remotely located input-output stations. Each of these remote stations must be small in size, simple to operate, substantially maintenance free, and low in cost. Further, each remote input/output (I/O) station preferably should provide means for making a permanent record of all inquiry messages sent to the central processing unit (CPU) therefrom and of all messages received from the CPU in response to the inquiry messages. In addition, because of economic factors, it is most desirable to have any operation delays occur within the I/O stations rather than within the large, costly CPU. Thus, each I/O station must be prepared to receive data messages from the CPU as soon as the latter is prepared to transmit them, thereby avoiding a costly tie-up of the CPU while an I/O station prepares to receive a response message.

It has been found that one of the most convenient methods of performing and recording data transactions at a remote I/O station is to utilize a data tape in association with means for recording an inqury message thereon at the discretion of an operator of the station, means for transmitting this inqury message to the CPU, means for recording a response message from the CPU on the tape, and means for exhibiting the response message in a form which may be read and handled by an operator of the station.

It is, therefore, an object of this invention to provide an improved data recording device for use with a data input/output station of a data processing system.

Another object is to provide an improved reversible tape drive which performs reliably, is physically compact, low in cost, and simple in operation.

Still another object is to provide an improved tape drive that will perform a continuing series of alternating tape advancing and tape backspacing operations so that a plurality of data messages may be, in alternating sequence, recorded on and read from a tape.

A further object is to provide an improved tape drive that will control the movement of a data tape relative to a data recording transducer so that a plurality of variable length data messages may be recorded immediately adjacent one another on the tape.

A still further object is to provide an improved tape drive that will alternately advance and backspace a tape, the distance which the tape is backspaced being equal to the distance which the tape was advanced during the preceding tape advancing operation.

Yet another object is to provide an improved tape drive that will control the movement of a data tape relative to a dual purpose recording-sensing transducer so that a plurality of data messages may be alternately recorded on and read from the tape without a time delay between the completion of the reading of one message and the start of the recording of the next succeeding message.

In accordance with the present invention, means are provided for advancing a data recording medium past a recording transducer so that a series of separate variable length messages may be recorded thereon. Further means are provided for backspacing the recording medium after a message has been recorded thereon so that the message may be sensed by a sensing transducer as it is advanced past that transducer. The recording medium is backspaced only so far as to permit the sensing of the last recorded message on the tape.

Thus, the present invention provides for the preservation on a single tape of an extensive series of alternating inquiry and response transactions between a remotely located I/O station and the CPU of a data processing system. What is more, the present invention is small in size, simple and reliable in its operation, and low in cost. Further, the present invention provides for the recording at an I/O station of a response message from the CPU immediately after an inquiry message has been transmitted from the I/O station, thus requiring no "preparation time" at the I/O station which might lead to a costly tie-up of the CPU.

The foregoing and other objects, features and advantages of the invention will be apparent from the following more particular description of a preferred embodiment of the invention as illustrated in the accompanying drawings.

Figure 4:
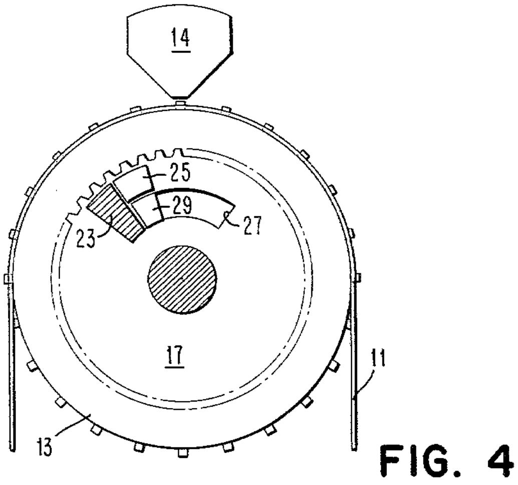
FIG. 4 is a sectional view taken, in elevation, along the line 4—4 of FIG. 3.

FIGS. *5a–5l* schematically illustrate the operation of a drive mechanism forming part of the preferred embodiment of the present invention, the view shown being similar to the view taken in FIG. 4.

Figure 6:
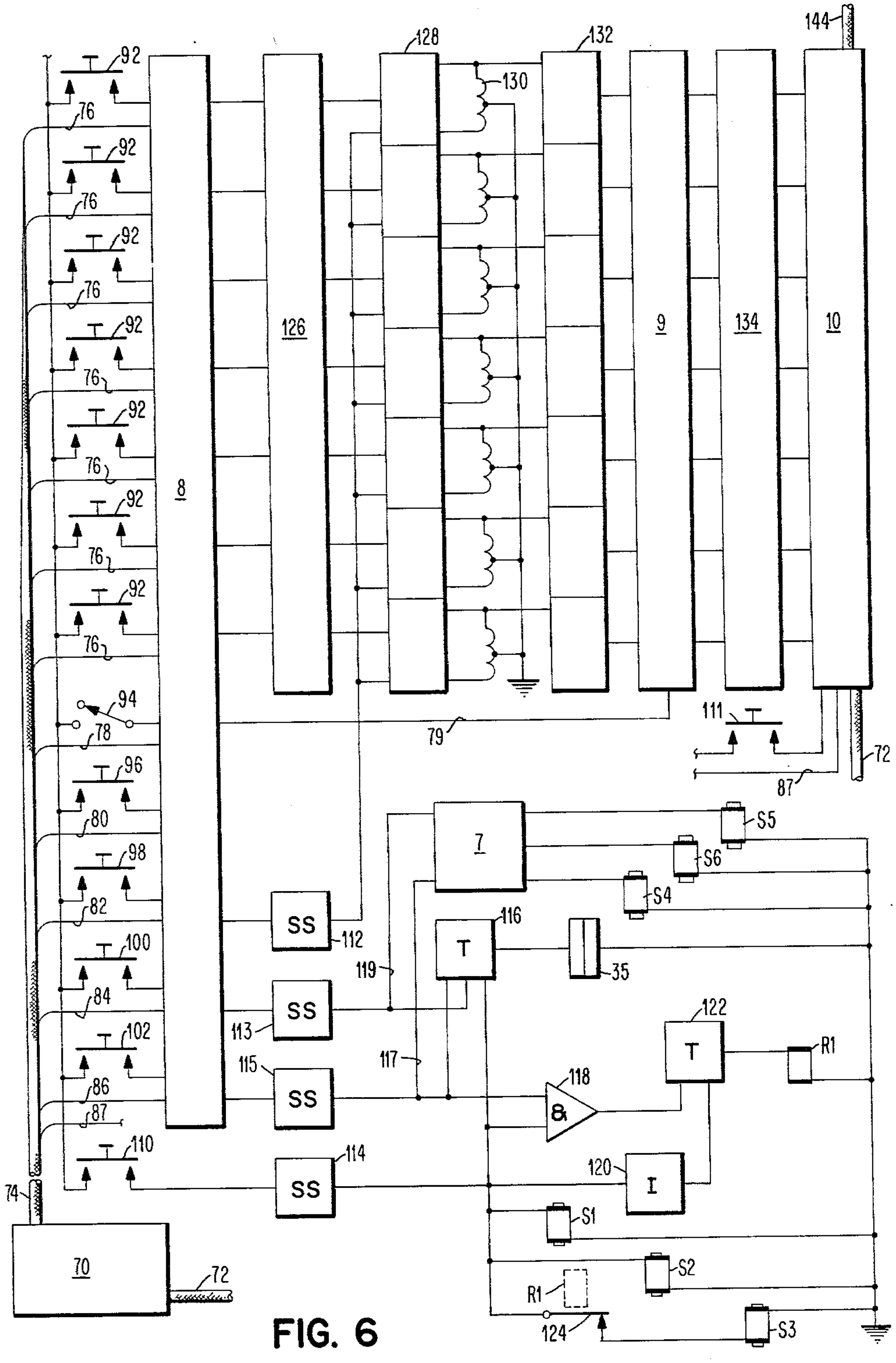

FIG. 6 is a diagram illustrating a circuit which may be used to control the operation of the present invention.

Figure 7:
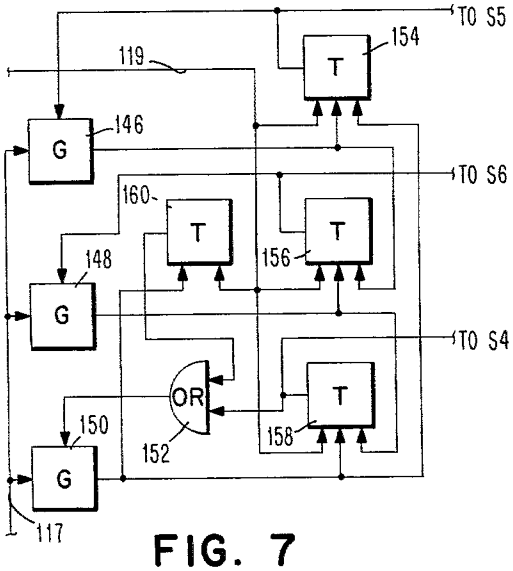

FIG. 7 is a detailed showing of the circuit 7 of FIG. 6.

Figure 8:
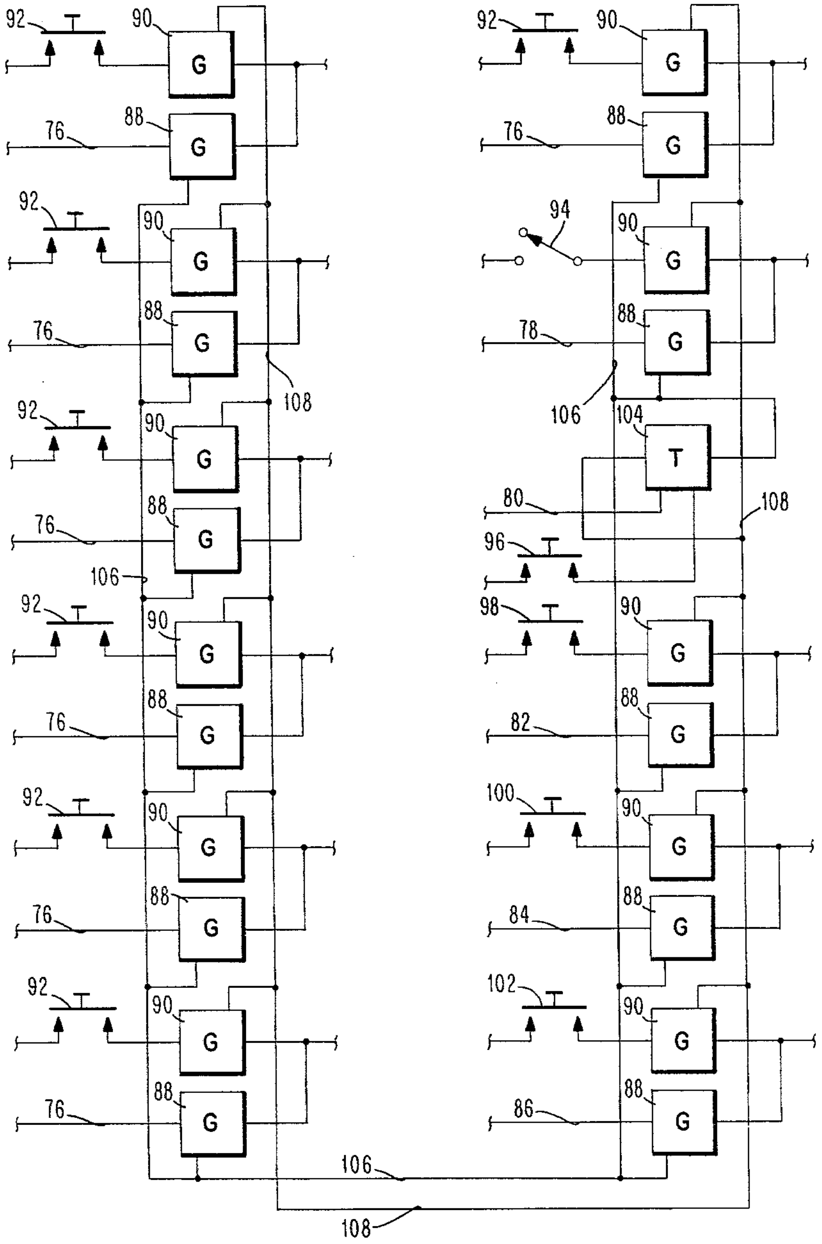

FIG. 8 is a detailed showing of the circuit 8 of FIG. 6.

Figure 9:
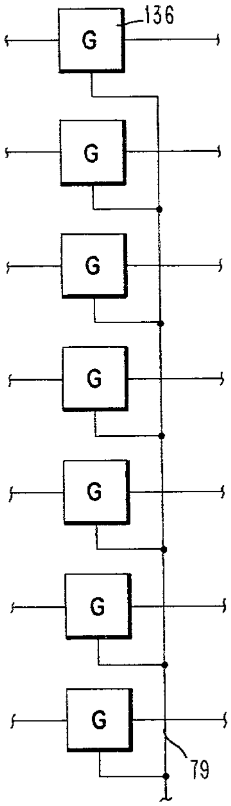

FIG. 9 is a detailed showing of the circuit 9 of FIG. 6.

Figure 10:
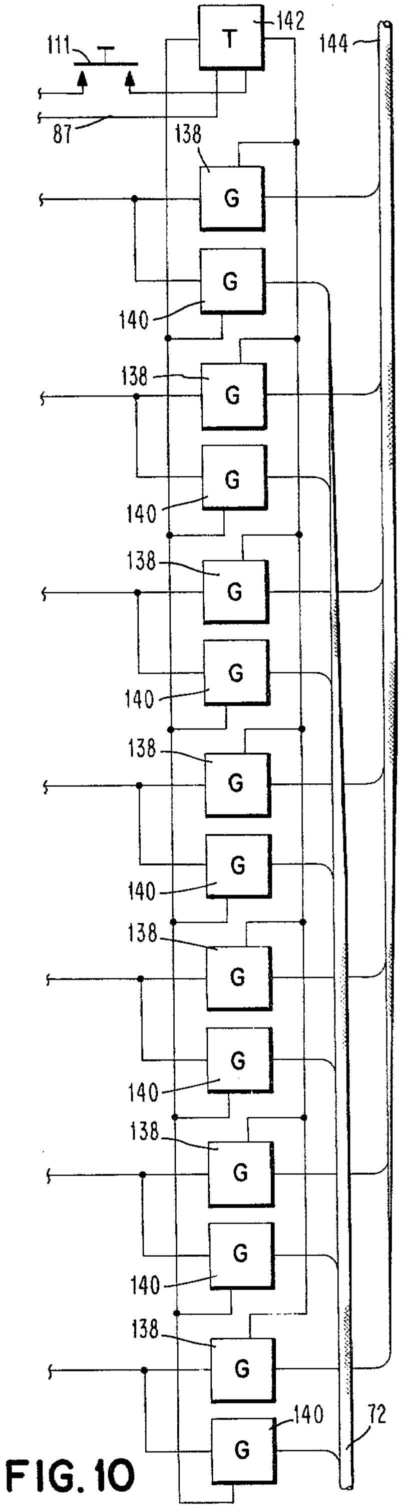

FIG. 10 is a detailed showing of the circuit 10 of FIG. 6.

Figure 1:
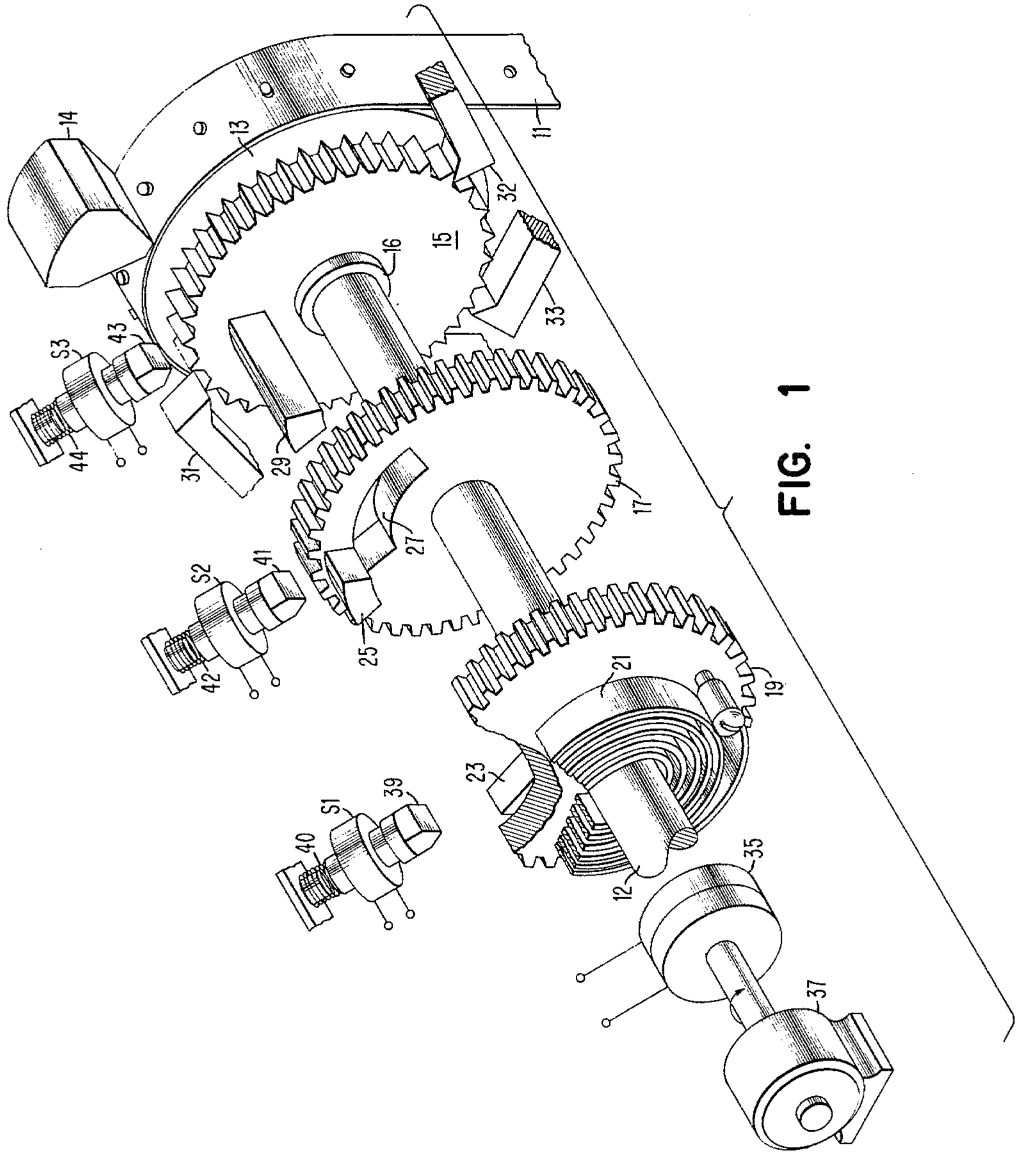
FIG. 1 is an exploded view, partially broken away, of the operating parts of a tape drive embodying the present invention.

A preferred embodiment of the present invention, shown in FIG. 1, comprises a rotatably-mounted center shaft 12 which supports three toothed wheels, 15, 17 and 19, and a tape drum 13. A data tape 11, such as a magnetic tape, is positively engaged by drum 13 by means of a sprocket arrangement, and is thereby supported in an operative relationship with a dual purpose recording-sensing transducer 14, which may be a magnetic write/read head. Drum 13 and toothed wheel 15, hereinafter referred to as the escapement wheel, are integrally connected to shaft 12 and rotate positively therewith. The toothed wheels 17 and 19, hereinafter referred to as the auxiliary index wheel and the primary index wheel, respectively, are both journaled rotatably on shaft 12. A clock spring 21 is attached between the shaft 12 and the primary index wheel 19 and thus resiliently restricts rotation therebetween. Auxiliary index wheel 17 frictionally engages escapement wheel 15 by means of a friction sleeve 53 (FIG. 3) and a collar 16; the former being connected to the auxiliary index wheel and the latter being a part of escapement wheel 15.

Coupled to the left end of shaft 12 is a motor 37 which supplies a constant clockwise (as seen in FIG. 1) torque to the drum 13 through an electromagnetic clutch 35. When the clutch 35 is engaged the drum 13 is incrementally stepped in a clockwise direction by operation of three escapement pawls, 31, 32 and 33, acting on escapement wheel 15. Mounted in a position to coact with the teeth of the primary index wheel 19, the auxiliary index wheel 17, and the escapement wheel 15, are three coil-actuated detent pawls, 39, 41 and 43, respectively. A compression spring 40 acts on the detent pawl 39 to keep it normally engaged with the teeth of the primary index wheel 19. Under this condition the wheel 19 is secured against rotation. A solenoid coil S1 may be actuated to withdraw the detent 39 from the teeth of wheel 19, against the bias of compression spring 40. Detents 41 and 43 coact, respectively, with tension springs 42 and 44, and are thus normally restrained from engagement with the teeth of wheels 17 and 15. Solenoid coils S2 and S3 are provided about the detents 41 and 43, and, when actuated force the detents 41 and 43 into engagement with the teeth of wheels 17 and 15 to secure them against rotation.

Figure 2:
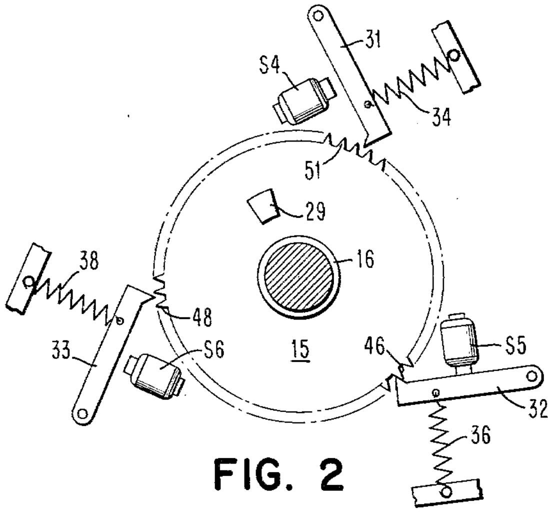
FIG. 2 is a schematic diagram showing an escapement mechanism which is used in conjunction with the embodiment of the invention shown in FIG. 1.

With reference to FIG. 2, the coaction between escapement pawls 31, 32 and 33 and the escapement wheel 15 will now be described. Associated with the pawls 31, 32 and 33 are, respectively, solenoid coils S4, S5 and S6, and tension springs 34, 36 and 38. In the condition depicted in FIG. 2, coil S5 has been energized, pulling pawl 32 into engagement with a tooth 46 on escapement wheel 15, thus restraining the escapement wheel against the clockwise torque supplied by the motor 37 through the electromagnetic clutch 35, which at this instant is caused to slip. In order to step the drum 13 one increment in the clockwise direction, the appropriate circuitry (to be described later) simultaneously deenergizes coil S5 and energizes coil S6. This causes the pawl 32 to be pulled clear of the escapement teeth by the spring 36 and interjects the pawl 33 into the path of rotation of the teeth of escapement wheel 15, allowing the wheel to rotate in the clockwise direction under the influence of the applied torque until a tooth 48 comes into contact with the pawl 33. The drum may be incremented a second time by de-energizing coil S6 at the same time coil S4 is energized, and a third time by de-energizing coil S4 at the same time coil S5 is energized, and so forth. By thus cyclically energizing and de-energizing the coils S4, S5 and S6, the tape drum 13 may be incrementally advanced in a clockwise direction so as to step the tape 11 beneath the write/read head 14.

Figure 3:
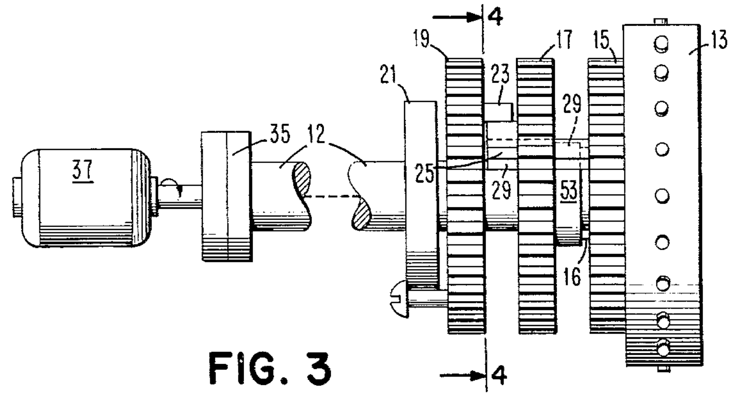
FIG. 3 is a top plan view showing the parts of FIG. 1 in an operating relationship, and excludes various control components shown in FIG. 1.

Referring now to FIGS. 1, 3 and 4 the coaction between the primary index wheel 19, the auxiliary index wheel 17 and the escapement wheel 15, will be described. Mounted integrally on the back side of the primary index wheel 19 is a stop lug 23, and mounted on the auxiliary index wheel 17 and the escapement wheel 15, respectively, are two lugs 25 and 29. The relationship between these three lugs, when the present invention is in an assembled state, is clearly shown in FIGS. 3 and 4. When no torque is applied to the shaft 12, the bias of clock spring 21 holds the lugs 25 and 29 against stop lug 23, as shown in FIG. 4, thereby holding the tape drum 13 and the escapement wheel 15, the auxiliary index wheel 17 and the primary index wheel 19 in a definite fixed relationship to each other. When the clutch 35 is engaged and the pawls 31, 32 and 33 are actuated to advance the escapement wheel 15, the normally engaged detent 39 will restrain the primary index wheel 19 from rotation, thus effecting a tightening of the clock spring 21 as the shaft 12 rotates in the clockwise direction, moving the tape 11 past the transducer 14 and pulling the lugs 25 and 29 away from contact with stop lug 23. When the torque is removed from the shaft 12 and the escapement pawls 31, 32 and 33 are simultaneously withdrawn from the path of rotation of escapement wheel 15, the energy stored in the clock spring 21 by the previous rotation of the shaft 12 will exert a counterclockwise torque on the shaft and cause the tape drum 13, the escapement wheel 15, and the auxiliary index wheel 17 to rotate in the counterclockwise direction until the lugs 25 and 29 again come into contact with stop lug 23 of the primary index wheel 19, thus backspacing the tape drum past transducer 14 and returning the tape 11 to its initial starting point in relation to the transducer.

If, however, the tape drum 13 is driven in the clockwise direction through a given angle relative to the secured primary index wheel 19 and is held there by detent 43 upon energization of coil S3, subsequent energization of coil S1 will release the primary index wheel 19 and allow it to rotate under the bias of clock spring 21 in the clockwise direction until stop lug 23 contacts the lug 29. This then, establishes the primary index wheel (after de-energization of coil S1) in a new reference position relative to the tape drum 13 and permits the previously described stepping and backspacing operations to be performed on a new segment of the tape 11. The operation just described will be hereinafter referred to as a "drum reference change" operation.

Is can be seen that if, during a drum reference change operation, escapement wheel 15 begins to advance in the clockwise direction before the lug 23 reaches the lug 29, the primary index wheel will not be stopped at a correct reference point (i.e., at the point where the escapement wheel was stopped prior to the newly initiated advancement). Thus, to ensure that the primary index wheel is stopped at the correct point to establish a new reference location, the auxiliary index wheel 17 with its lug 25 is provided.

By means of the frictional coupling between sleeve 53 and collar 16, the auxiliary index wheel 17 rotates with the escapement wheel 15. However, when solenoid S2 actuates detent 41 to block rotation of the auxiliary index wheel 17, the friction coupling is overcome and the escapement wheel may be rotated relative to the auxiliary index wheel, the lug 29 moving in a slot 27 of the auxiliary index wheel 17. Thus, if during a drum reference change operation, the escapement wheel begins rotating before the clock spring 21 has rotated the primary index wheel to the new reference location, the auxiliary index wheel is maintained by the detent 41 at the correct reference location and the lug 25, acting alone, arrests rotation of the primary index wheel. When this occurs solenoid coils S1 and S2 are simultaneously de-energized to lock the primary index wheel at the new reference location and to release the auxiliary index wheel so that it resumes rotation with the escapement wheel. At this point the lugs 25 and 29 are out of alignment. However, a subsequent backspacing operation (as previously described) will allow the clock spring 21 to rotate both the escapement wheel and the auxiliary index wheel in a counterclockwise direction until the lugs 25 and 29 contact stop lugs 23, being realigned thereon.

FIG. 6 shows an electrical circuit which may be used to control the above-described mechanical operation of the preferred embodiment of the present invention in conjunction with a central processing unit and with a manually controlled data input/output device, such as a typewriter, to effect the desired data transactions.

Central processing unit (CPU) 70, includes for example, an electronic computer with peripheral data receiving, data transmitting, and data handling equipment.

The CPU 70 receives data impulses from a remotely located I/O station on input line 72 and transmits data impulses to the I/O station on line 74. The line 74 may, in actual practice, be a single multi-signal carrying transmission line, but, for simplicity, is shown as comprising a plurality of individual conductors for transmitting various types of information to the I/O station. In the embodiment shown, conductor 74 includes 13 separate conductors, seven of which (lines 76) are used to carry electrical impulses representing an information message in coded form. The remaining six lines 78, 80, 82, 84, 86 and 87 are used to transmit signals from controlling the previously described mechanical operation of the tape unit.

Eleven of the thirteen CPU output lines, lines 76, 78, 82, 84 and 86, are connected to the inputs of eleven gate circuits 88 (FIG. 8) in the switching circuit 8. CPU output line 80 is connected to the left input of a trigger 104. A pulse on line 80 switches trigger 104, raising the voltage level of line 106, thus conditioning gate circuits 88 so that any CPU output signals appearing at the respective inputs of gates 88 will be gated through the switching circuit 8.

The manual switches shown in FIGS. 6 and 8 represent data input and control switches located at the I/O station. Consequently, it can be seen in FIG. 8 that the trigger 104 may be used to condition either the gate circuits 88 or the gate circuits 90, thereby permitting entry of data and control signals from either the CPU or the I/O station depending upon the state of the trigger. Switch 96, then, must be pressed by an operator at the I/O station, prior to the entry of any data or control signals into the system therefrom. Likewise, it can be seen that the CPU must send a signal on line 80 before sending any data or control signals to the I/O station.

Data to be recorded on the tape 11 is entered into the write circuitry comprising write register 126, write circuits 128 and write coils 130. This data is entered either on lines 76, if the data is coming from the CPU, or by the switches 92, if the data is coming from the I/O station. Write circuits 126 and 128 may be of the type disclosed in U.S. Patent 2,978,678 to Winger et al. After data has been gated through switching circuit 8 into write circuits 128 (via register 126), the input to single-shot multivibrator 112 is activated either by switch 98 or by input line 82, depending upon the mode of control (i.e., control from either the I/O station or the CPU). Single-shot 112, upon receiving an input pulse, sends an output pulse to the write circuits 128. This pulse gates the information through write circuits 128, energizing write coils 130 of magnetic head 14, thus recording a character of information on the tape 11. Next, single-shot multivibrator 115 is energized and the pulse issuing therefrom turns the trigger 116 "on," engaging clutch 35. This single-shot pulse also energizes escapement control circuit 7 and the upper input of AND circuit 118, the function of which will be described later.

The escapement control circuitry 7 is shown in detail in FIG. 7. This circuit is basically a trigger ring comprising triggers 154, 156 and 158, and also includes trigger 160, OR circuit 152, and gate circuits 146, 148 and 150. Initially, trigger 160 is "on," conditioning OR 152. When a pulse from single-shot 115 enters the escapement circuitry on line 117, it passes through gate 150, which is conditioned by the output of OR 152. The output of gate 150 switches trigger 160 "off" and switches the trigger 154 "on," thus, conditioning gate 146 and energizing solenoid coil S5 which drops escapement pawl 32 into the position shown in FIG. 2.

After another character of data has been entered into the write circuitry and gated onto the tape 11 by a pulse from single-shot 112, single-shot 115 is again pulsed to activate the escapement control circuit 7 a second time. This second pulse on line 117 is gated only through gate 146, which had been conditioned by the output of trigger 154. Trigger 154 is thus turned "off," allowing pawl 32 to be withdrawn, and trigger 156 is turned "on," actuating pawl 33. Trigger 156 also energizes gate circuit 148 so that the next pulse on line 117 is gated only through gate circuit 148 and acts to turn trigger 156 "off," thereby releasing escapement pawl 33, and turns trigger 158 "on." The output of trigger 158 energizes gate circuit 150 through OR circuit 152 and also energizes solenoid S4 to actuate escapement pawl 31. It can be seen that each subsequent pulse entering circuit 7 on line 117 will de-energize one solenoid coil while it energizes the next coil in the clock sequence, thereby advancing the escapement wheel and tape drum one increment in the clockwise direction (FIG. 1).

Backspacing of the tape drum is controlled by a pulse issuing from single-shot 113 (FIG. 6). This pulse turns trigger 116 "off," thereby disengaging clutch 35, and enters circuit 7 on line 119. Line 119 (FIG. 7) is connected to turn off triggers 154, 156 and 158 and to turn on trigger 160. Thus, a pulse on line 119 de-energizes solenoids S4, S5 and S6, withdrawing all three escapement pawls, and conditions gate 150 to prepare circuit 7 for resumption of the drum stepping operation whenever a pulse is subsequently received on input line 117. With the clutch 35 disengaged and all escapement pawls withdrawn, the clock spring 21 backspaces the tape drum as previously described.

Read circuits 132 (FIG. 6) are connected to the coils 130 of magnetic head 14 and receive and amplify pulses picked up by the coils 130 as recorded information on the tape 11 is moved past the coils 130. When the tape is stepped or incremented past the read head, as is done in the preferred embodiment of the present invention, it may be desirable, in order to produce discrete signals in the read operation, to employ a static flux-sensitive head such as the one shown in copending application, Ser. No. 15,935, filed Mar. 18, 1960, by Chang.

To gate signals out of the read circuitry, a gating circuit 9 is provided. The circuit 9, shown in detail in FIG. 9, comprises a row of gate circuits 136 which, when impulsed, gate information signals into a read register 134 from the read circuits 132. The circuit 10, shown in detail in FIG. 10, then channels the output data to either a print-out device, such as an automatic typewriter, via line 144, or to the CPU, via line 72. As can be seen in FIG. 10 the destination of this output information is controlled by the state of a trigger 142. A pulse initiated at a manual input switch 111 conditions the gates 140, thereby activating output line 72, while a pulse on line 87 initiated by the CPU conditions gates 138 and activates output line 144.

Manual switch 110 (FIG. 6) controls the drum reference change operation. A measured pulse issuing from single-shot 114 turns trigger 116 "off," thus disengaging clutch 35; supplies an input to AND circuit 118; drops the voltage input of the right-hand side of trigger 122 through inverter 120; and energizes solenoid coils S1, S2 and S3. Consequently, if switch 110 is actuated after the tape drum has been stepped in the clockwise direction and before a drum backspace operation has been performed, the escapement wheel and the auxiliary index wheel will be locked in a forward position relative to the stop lug 23 of the primary index wheel, and the primary index wheel will be released to be rotated by clock spring 21 in the clockwise direction until it is arrested when stop lug 23 contacts lugs 25 and 29 on the auxiliary index wheel and the escapement wheel, respectively.

The measured pulse issuing from single-shot 114 is designed to be equal in duration to the length of time it takes clock spring 21 to rotate the primary index wheel the maximum distance it may have to travel (approximately 300°). Therefore, when the pulse from single-shot 114 terminates, the stop lug 23 on the primary index wheel will have made contact with lugs 25 and 29 to locate the primary index wheel in its new reference position. Termination of this pulse de-energizes solenoid coils S1, S2 and S3, locking the primary index wheel at the new reference position, and freeing escapement wheel 15 and auxiliary index wheel 17 to be advanced upon subsequent operation of the escapement mechanism.

However, as indicated in the foregoing description, a situation may occur where a tape drum stepping operation is initiated before clock spring 21 has located the primary index wheel at the new reference position (i.e., before termination of a drum reference change operation). It is to be noted that the pulse which initiates this drum stepping operation issues from single-shot 115 and, among other things, energizes the upper input of AND circuit 118. If a drum reference change operation should still be in process, that is, a signal is still existent at the output of single-shot 114, both inputs to AND circuit 118 will be simultaneously energized, thus causing an output to be issued therefrom. This AND circuit output switches trigger 122 "on," thereby energizing relay coil R–1.

Relay coil R–1 then picks relay 124 to de-energize solenoid coil S3, withdrawing detent 43 from the escapement wheel. This frees the tape drum for a stepping operation, but maintains the auxiliary index wheel fixed in an angular position corresponding to the position of the drum prior to initiation of the stepping operation. Lug 25, acting alone, arrests rotation of the primary index wheel at the correct position. When the output pulse from single-shot 114 terminates, inverter 120 will issue a positive pulse to the right-hand input of trigger 122 and turn the latter "off." This returns relay 124 to its normally closed position, but the solenoid S3 will not be re-energized because of the termination of single-shot pulse 114. Further, coils S1 and S2 also become de-energized so that the primary index wheel is locked in its new reference position by the detent 39 and the auxiliary index wheel is released from the hold of detent 41 so that it may once again rotate with the escapement wheel and tape drum assembly under the influence of friction sleeve 53 (FIG. 3). As previously described, the lugs 25 and 29 will re-align themselves upon contact with stop lug 23 when the next subsequent backspace operation is performed.

Now, referring to FIGS. *5a*–*5l* and generally to FIGS. 1 and 6, the operation of the entire data transfer system will be described. The description of the overall operating cycle of the preferred embodiment of the present invention will be begun at the point where an operator at the remotely located I/O station desires certain information from the CPU. This means that an "inquiry message" must be sent to the CPU. To initiate the sending of an inquiry message the input control switch 96 is pressed. This sets switching circuit 8 to allow entry of information into, and to permit control of the tape drive of the present invention from the I/O station. Next, the "drum reference change" switch 110 is operated to insure that the primary index wheel is located and locked in an angular position corresponding to the present angular position of the tape drum, as indicated by the positions of lugs 23, 25 and 29 in FIG. *5a*. The first data character of the inquiry message is entered into write register 126 by manipulation of data input switches 92. It is to be understood that this operation may be performed by pressing a single typewriter key, even though FIG. 6 shows, for the sake of simplicity, seven individual switches on the seven information bit input lines.

After the character has been entered into write register 126, write switch 98 is pressed to gate out the character in register 126 onto the magnetic tape via write coils 130. Next, "drum step" switch 102 is operated in order to advance the tape one increment past the write/read head 14 (FIG. 1). It is to be noted that the "data input," "write," and "step" operations just described may be effected by the pressing of a single key on a typewriter, but, because such refined control is not a part of the present invention, disclosure thereof has been omitted for the sake of simplicity. These same three steps may be repeated in the sequence just described a sufficient number of times to complete the recording of the inquiry message on the tape, at which time the tape drive components are positioned as indicated in FIG. *5b*. The position of the inquiry message on the tape is indicated by "I" in FIG. *5b*.

It is to be noted that the maximum length of a message corresponds to slightly less than one revolution of the tape drum. This limitation is caused by the presence of the stop 23, which limits the drum 13 (through lug 29) to less than one revolution of travel during any one stepping operation.

To transmit the inquiry message to the CPU, the "drum backspace" switch 100 is operated to allow the tape drum to be rotated in the counterclockwise direction until lugs 25 and 29 butt against stop lug 23, thereby resetting the first character of the inquiry message beneath write/read head 14 (FIG. *5c*). The operator then closes read switch 94 and presses "output control" switch 111 to permit the first character of the inquiry message to be transmitted on line 72 to the CPU. Next, the step switch 102 is repeatedly pressed, either under manual control or under a system of high speed automatic control at the I/O station (not shown), until the entire inquiry message has been transmitted to the CPU (FIG. *5d*). The operator now completes the manual control operations by opening read switch 94 and by operating the drum reference change switch 110 to set the primary index wheel at a new reference location (FIG. *5e*), thereby preparing the tape drive mechanism to undergo a series of operations similar to the one just described as the CPU transmits a "response message," answering the inquiry message, to the I/O station.

The first component of the response message is an input control pulse received at the I/O station on line 80. This pulse sets switching circuit 8 so that it will gate incoming CPU response signals into the circuit of FIG. 6. Following this input control pulse are the following series of pulses, received in order by circuit 8: data input pulses representing the first character of the response message (lines 76), a write pulse (line 82), and a step pulse (line 86). As in the manual recording of an inquiry message these pulses are repeated until the entire response message (shown at "R" in FIG. *5f*) has been recorded on the tape. At this point, the components of the tape mechanism are relatively positioned as indicated in FIG. *5f*. Since the recording of the response message is automatically controlled by commands from the CPU, the tape drive may be operated at a maximum rate of speed, there being no manual operations to slow the system down.

Next, a backspace signal is received on line 84 to reset the recorded response message in the position shown in FIG. *5g*. Following the backspace signal, a continuing read signal is initiated on line 79 (via CPU output line 70) to open the read circuit gates 136 of circuit 9. Received simultaneously with the read signal is an output control signal, appearing on line 87. The last two signals mentioned serve to gate the first character of the response message out of the read circuits 132 and read register 134 and into a print-out device via line 144. To complete the reading of the response message, a series of step signals is sent on line 86 to advance the recorded response message past the write/read coils 130 (FIG. *5h*). These step signals may be timed to advance the tape drum at the maximum print speed of the print-out device. When the response message has been completely received and displayed by the print-out device, the operator at the I/O station completes the full cycle of operation of the system by operating drum reference change switch 110. This places the components of the tape drive in the position shown in FIG. *5i* and prepares the system to begin the cycle anew with the recording of another inquiry message.

Figure 5A:
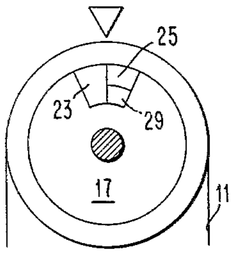
Figure 5B:
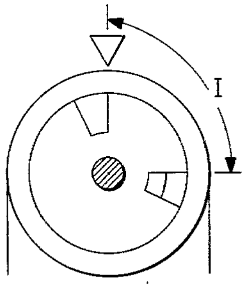
Figure 5C:
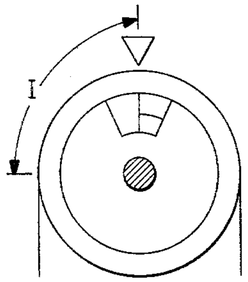
Figure 5D:
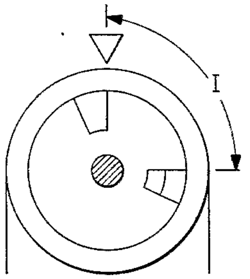
Figure 5E:
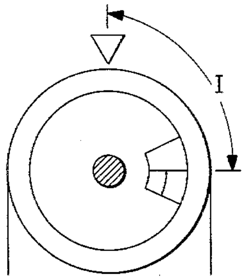
Figure 5F:
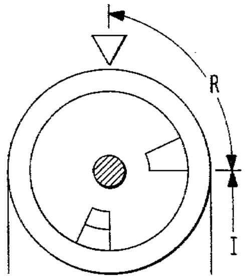
Figure 5G:
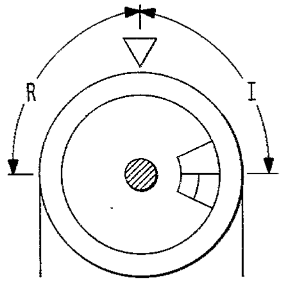
Figure 5H:
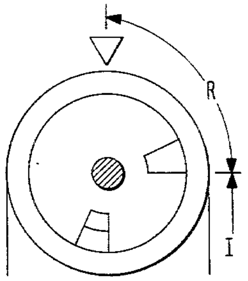
Figure 5I:
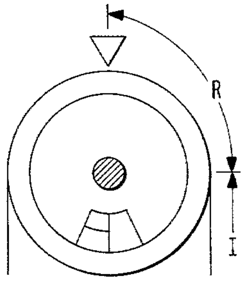
Figure 5J:
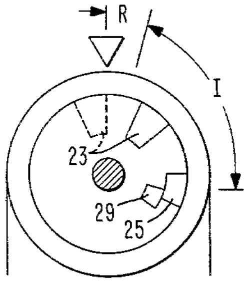
Figure 5K:
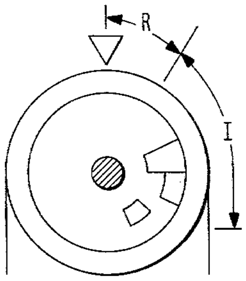
Figure 5L:
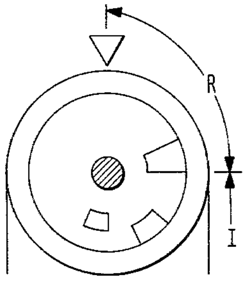

Because of the high rate of speed at which the CPU may operate, it is possible that a response message may begin arriving at the I/O station while the tape drive is in the midst of a drum reference change operation (between the positions shown in FIGS. *5d* and *5e*). The operation of the tape drive in this situation is schematically represented in FIGS. *5j*, *5k* and *5l*. It has been assumed in FIG. *5j* that the tape drum began advancing to record the response message at approximately the same instant that a drum reference change signal was manually initiated at switch 110. Thus, the clock spring 21 has moved stop member 23 from its position as indicated in FIG. *5d*, shown in dashed lines in FIG. 5*j*, to the position indicated by solid lines in FIG. 5*j*. Further, the lug has moved out of alignment with lug 25 as the tape drum has advanced to record the first part of the incoming response message represented at R, while the auxiliary index wheel is held by detent 41. FIG. 5*k* shows the positions of the three lugs at the moment in time when the primary index wheel is locked in its new reference position and the auxiliary index wheel is released to continue rotation with the escapement wheel. Thus, as represented in FIG. 51, the lugs 25 and 29 are not in alignment when the response message is fully recorded and the drum is stopped. However, after a backspace command has been transmitted by the CPU to reset the response message prior to read-out, the lugs 25 and 29 re-align themselves on stop lug 23 and assume their normal relationship, as indicated in FIG. 5*g*.

As described, then, the tape drive of the present invention manipulates the movement of a magnetic tape past a dual-purpose write/read magnetic head in order to perform a series of data transactions between a remotely located I/O station and the CPU of a data processing network. The magnetic tape used in conjunction with the tape drive of the present invention not only serves as a means for transmitting an inquiry message from an I/O station to the CPU, and as a means for transmitting a response message to a print-out device after the former has been received at the I/O station, but also serves as a permanent record of a complete series of inquiry and response data transactions taking place between an I/O station and the CPU over a period of time. Further, even though the individual messages recorded on the tape may be varied in length, it is to be observed that, because of the inherent operation of the present invention, these messages are compactly recorded, immediately adjacent one another, on the tape.

Furthermore, the auxiliary index wheel 17 and its lug 25, along with the solenoid actuated detent 41, permit the tape drum to be advanced in order to record an incoming response message even before the primary index wheel 19 has been secured in its new reference position. Because of this feature, the I/O station is instantly prepared to receive and record a response message from the CPU, thereby eliminating costly delay time at the latter. What is more, the tape drive of the present invention comprises a small number of mechanical parts supplemented by a series of very basic electronic circuits and therefore is physically small in size, simple and reliable in its operation, and low in cost.

While the invention has been particularly shown and described with reference to a preferred embodiment thereof, it will be understood by those skilled in the art that various changes in form and detail such as, for example, eliminating the tape II and magnetizing the surface of drum 13 for use directly as a data record surface, may be made therein without departing from the spirit and scope of the invention.

What is claimed is:

1. A data tape handling device comprising:
tape engaging means movable in a forward direction and reverse direction along a confined path;
limit means mounted to move along said path;
first releasable detent means for securing said limit means at selected points on said path;
resilient means between said engaging means and said limit means, said resilient means being biased to draw said engaging means against said limit means, thereby holding the former at an initial point of reference on said path;
drive means including coupling means for driving said engaging means in said forward direction away from said limit means, further biasing said resilient means, said coupling means comprising clutch means for decoupling said drive means from said engaging means, whereby said engaging means is returned to said initial point of reference by the bias force exerted by said resilient means;
second releasable detent means for securing said engaging means at selected points on said path; and
control means for alternately actuating said first and second detent means, whereby said engaging means may be secured at a point on said path forward of said initial point of reference and said limit means may be released to be drawn by said resilient means into contact with said engaging means to establish a new point of reference on said path.

2. A data tape handling device comprising:
tape engaging means movable in a forward direction and a reverse direction along a confined path;
registering means frictionally connected to said engaging means and movable therewith along said path;
limit means mounted to move along said path;
first releasable detent means for securing said limit means at selected points on said path;
resilient means between said engaging means and said limit means, said resilient means being biased to draw said engaging means and said registering means against said limit means, thereby holding said engaging means and said registering means at an initial point of reference on said path;
drive means including coupling means for driving said engaging means and said registering means in said forward direction away from said limit means, further biasing said resilient means, said coupling means comprising clutch means for de-coupling said drive means from said engaging means, whereby said engaging means and said registering means are returned to said initial point of reference by the bias force exerted by said resilient means;
second releasable detent means for securing said registering means at selected points on said path; and
control means for alternately actuating said first and second detent means, whereby said registering means may be secured at a point on said path forward of said initial point of reference and said limit means may be released to be drawn by said resilient means into contact with said registering means to establish a new point of reference on said path.

3. A data tape handling device comprising:
a tape engaging drum rotatable in a forward direction and a reverse direction about its axis;
a lug member fixed eccentrically on said drum and being movable therewith in a circular path about the axis of said drum;
limit means mounted co-axially of said drum and adapted to move along said path;
first releasable detent means for securing said limit means in selected angular positions about the axis of said drum;
spring means between said drum and said limit means, said spring means being biased to draw said lug member against said limit means, thereby holding said drum in an initial angular reference position;
drive means including coupling means for rotating said drum in said forward direction, thereby moving said lug away from said limit means and further biasing said spring means, said coupling means comprising clutch means for decoupling said drive means from said drum, whereby said drum is rotated in said reverse direction by said spring means until said lug contacts said limit means, returning said drum to said initial angular reference position;
second releasable detent means for securing said drum in selected angular positions about its axis; and
control means for alternately actuating said first and second detent means, whereby said drum may be secured in an angular position forward of said initial reference position and said limit means may be released to be drawn by said spring means into contact with said lug member to establish a new angular reference position.

4. A data tape handling device comprising:
a tape engaging drum rotatable in a forward direction and a reverse direction about its axis;
a first lug member fixed eccentrically on said drum and being movable therewith in a first circular path about the axis of said drum;
registering means mounted co-axially of said drum and rotatable through frictional engagement therewith;
a second lug member fixed eccentrically on said registering means and being movable therewith in a second circular path concentric with said first circular path;
limit means mounted co-axially of said drum and adapted to move along a circular path comprehending both said first and said second circular paths;
first releasable detent means for securing said limit means in selected angular positions about the axis of said drum;
spring means between said drum and said limit means, said spring means being biased to draw said first and said second lug members against said limit means, thereby holding said drum and said registering means in an initial angular reference position;
drive means including coupling means for rotating said drum and said registering means in said forward direction, thereby moving said first lug and said second lug away from said limit means and further biasing said spring means, said coupling means comprising clutch means for decoupling said drive means from said drum, whereby said drum and said registering means are rotated in said reverse direction by said spring means until said first and said second lugs contact said limit means, returning said drum and said registering means to said initial angular reference position;
second releasable detent means for securing said registering means in selected angular positions about the axis of said drum; and
control means for alternately actuating said first and second detent means, whereby said registering means may be secured in an angular position forward of said initial angular reference position and said limit means may be released to be drawn by said spring means into contact with said second lug member to establish a new angular reference position.

5. A data tape handling device comprising:
a shaft rotatable in a forward direction and a reverse direction about its axis;
a tape engaging drum fixed to said shaft;
a lug member fixed eccentrically on said drum and being movable therewith in a circular path about the axis of said shaft;
a disk journaled on said shaft;
a stop member eccentrically connected to said disk and being movable therewith in a circular path coincident with the path of said lug member;
a first releasable pawl coacting with said disk for securing said disk at selected angular positions about the axis of said shaft;
a clock spring connecting said disk and said shaft, said spring being biased to draw said lug member against said stop member, thereby holding said drum in an initial angular reference position;
drive means including coupling means for rotating said drum in said forward direction, thereby moving said lug away from said stop member and further biasing said clock spring, said coupling means comprising clutch means for decoupling said drive means from said drum, whereby said drum is rotated in said reverse direction by said clock spring until said lug contacts said stop member, returning said drum to said initial angular reference position;
a second releasable pawl mounted in juxtaposition to said drum for securing said drum in selected angular positions about the axis of said shaft; and
control means for alternately actuating said first and said second pawls, whereby said drum may be secured in an angular position forward of said initial angular reference position and said disk may be released to rotate said stop member into contact with said lug member, which action locates said disk at a new angular reference position.

6. A data tape handling device comprising:
a shaft rotatable in a forward direction and reverse direction about its axis;
a tape engaging drum fixed to said shaft;
a first lug member fixed eccentrically on said drum and being movable therewith in a first circular path about the axis of said shaft;
a first disk journaled to said shaft adjacent said drum and rotatable through frictional engagement therewith;
a second lug member fixed eccentrically on said first disk and being movable therewith in a second circular path concentric with said first circular path;
a second disk journaled on said shaft;
a stop member eccentrically connected to said second disk and being movable therewith in a circular path comprehending both said first and said second circular paths;
a first releasable pawl coacting with said second disk for securing said second disk at selected angular positions about the axis of said shaft;
a clock spring connecting said second disk and said shaft, said spring being biased to draw said first and second lug members against said stop member, thereby holding said drum and said first disk in an initial angular reference position;
drive means including coupling means for rotating said drum and said first disk in said forward direction, thereby moving said first lug and said second lug away from said stop member and further biasing said clock spring, said coupling means comprising clutch means for decoupling said drive means from said drum, whereby said drum and said first disk are rotated in said reverse direction by said clock spring until said first and said second lugs contact said stop member, returning said drum and said first disk to said initial angular reference position;
a second releasable pawl mounted in juxtaposition to said first disk for securing said first disk at selected angular positions about the axis of said shaft; and
control means for alternately actuating said first and second pawls, whereby said first disk may be secured in an angular position forward of said initial angular reference position and said second disk may be released to rotate said stop member into contact with said second lug member, which action locates said second disk at a new angular reference position.

7. A data handling device for recording data and subsequently sensing said data, comprising:
data record means movable in a forward direction and a reverse direction along a confined path;
transducer means mounted adjacent said path, said transducer means including means for recording data on said data record means and means for sensing data on said data record means;
limit means mounted to move along said path;
first releasable detent means for securing said limit means at selected points on said path;
resilient means between said record means and said limit means, said resilient means being biased to draw said record means against said limit means, thereby holding said record means at an initial point of reference on said path;
drive means including coupling means for driving said record means in said forward direction away from said limit means, further biasing said resilient means, said coupling means comprising clutch means for de-coupling said drive means from said record means, whereby said record means is returned to said initial point of reference by the bias force exerted by said resilient means;

first control means for operating said data recording means, whereby data may be recorded on said record means as said record means is driven by said drive means in said forward direction past said transducer means, and for thereafter de-coupling said clutch means to effect said record means returning operation of said last mentioned means;

second control means for operating said data sensing means and for coupling said clutch means, whereby data recorded on said record means may be sensed as said record means is driven by said drive means in said forward direction past said transducer means;

second releasable detent means for securing said record means at selected points on said path; and third control means for alternately actuating said first and second detent means, whereby said record means may be secured at a point on said path forward of said initial point of reference and said limit means may be released to be drawn by said resilient means into contact with said record means to establish a new point of reference on said path in preparation for repetition of said recording-sensing operation on a subsequent section of said record means.

8. A data tape handling device, comprising:

tape engaging means for moving a tape forward and rearward along a path;

movable limit means for limiting the rearward movement of said engaging means;

releasable detent means for securing said limit means in a fixed position;

resilient means biasing said engaging means and said limit means against each other, whereby said engaging means is maintained in a home position;

means for moving said engaging means in said forward direction and for releasing said engaging means to be returned to said home position; and means for securing said engaging means in a forward position and for releasing said detent means to allow said resilient means to move said limit means against said engaging means to establish a new home position.

References Cited by the Examiner

UNITED STATES PATENTS

| | | | |
|---|---|---|---|
| 2,528,489 | 11/50 | Bednash et al. | 192—149 |
| 2,732,504 | 1/56 | Steele | 242—55.12 |
| 2,767,243 | 10/56 | Steeneck | 340—174.1 |
| 2,770,674 | 11/56 | Brewster | 340—174.1 |
| 3,029,034 | 4/62 | Genning | 242—55.12 |

OTHER REFERENCES

Lisinski: Escapement Mechanism, IBM Technical Disclosure Bulletin, vol. 2, No. 4, December 1959, pps. 17, 18.

IRVING L. SRAGOW, *Primary Examiner.*